US009129171B2

United States Patent
Ishigami

(10) Patent No.: US 9,129,171 B2
(45) Date of Patent: Sep. 8, 2015

(54) CODE READING DEVICE AND CODE READING METHOD

(71) Applicant: Panasonic Corporation, Osaka (JP)

(72) Inventor: Tomohide Ishigami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/348,252

(22) PCT Filed: Jun. 26, 2013

(86) PCT No.: PCT/JP2013/003981
§ 371 (c)(1),
(2) Date: Mar. 28, 2014

(87) PCT Pub. No.: WO2014/020820
PCT Pub. Date: Feb. 6, 2014

(65) Prior Publication Data
US 2014/0231526 A1 Aug. 21, 2014

(30) Foreign Application Priority Data
Jul. 31, 2012 (JP) .................................. 2012-169876

(51) Int. Cl.
*G06K 7/10* (2006.01)
*G06T 1/00* (2006.01)
(Continued)

(52) U.S. Cl.
CPC ........ *G06K 7/10544* (2013.01); *G06F 3/03545* (2013.01); *G06K 7/10* (2013.01); *G06K 7/10722* (2013.01); *G06K 19/06037* (2013.01); *G06T 1/00* (2013.01)

(58) Field of Classification Search
CPC ......... G06K 7/10; G06K 19/06; G06K 17/00; G06F 17/00; G06F 11/00; G07C 13/00
USPC ............... 235/470, 494, 375, 386, 51; 705/12
See application file for complete search history.

(56) References Cited

U.S. PATENT DOCUMENTS 5,748,777 A * 5/1998 Katayama et al. ............ 382/199
5,866,895 A * 2/1999 Fukuda et al. ................ 235/494
(Continued)

FOREIGN PATENT DOCUMENTS

JP 2003-529853 10/2003
JP 2005-92436 4/2005
(Continued)

OTHER PUBLICATIONS

International Search Report issued Sep. 24, 2013 in International (PCT) Application No. PCT/JP2013/003981.

*Primary Examiner* — Edwyn Labaze
(74) *Attorney, Agent, or Firm* — Wenderoth, Lind & Ponack, L.L.P.

(57) ABSTRACT

A code reading device includes a neighbor searching and voting unit that, for each of a part of dot marks located in a matrix displaced from virtual lattice points, votes on coordinate values of four neighboring dot marks, using each of the part of the dot marks as a reference point, in a plane; a direction detecting unit that determines first and second directions from the voting results; an order determining unit that determines a raster order for the part of the dot marks based on the directions; and a code detecting unit that detects a relative position of each of lattice points determined based on coordinate values of the part of the dot marks and the raster order, to a closest dot mark among the part of the dot marks according to the raster order, thereby encoding the part of the dot marks to provide the positional information.

10 Claims, 13 Drawing Sheets

(51) Int. Cl.
  *G06K 19/06* (2006.01)
  *G06F 3/0354* (2013.01)

(56) References Cited

U.S. PATENT DOCUMENTS

| | | |
|---|---|---|
| 6,586,688 B2 | 7/2003 | Wiebe |
| 7,050,653 B2 | 5/2006 | Edsö et al. |
| 7,664,312 B2 | 2/2010 | Yoshida |
| 2002/0033820 A1 | 3/2002 | Wiebe |
| 2002/0044138 A1 | 4/2002 | Edso et al. |
| 2007/0164110 A1 | 7/2007 | Yoshida |
| 2011/0279471 A1* | 11/2011 | Roskind et al. .............. 345/582 |
| 2013/0314313 A1 | 11/2013 | Ericson et al. |
| 2014/0062964 A1* | 3/2014 | Nagaoka ...................... 345/175 |

FOREIGN PATENT DOCUMENTS

| | | |
|---|---|---|
| JP | 2006-318507 | 11/2006 |
| JP | 2009-181341 | 8/2009 |
| JP | 2009-193234 | 8/2009 |
| JP | 2011-34548 | 2/2011 |
| JP | 4783535 | 9/2011 |
| WO | 01/75783 | 10/2001 |
| WO | 2012/010441 | 1/2012 |

\* cited by examiner

CODE READING DEVICE AND CODE READING METHOD

TECHNICAL FIELD

The present invention relates to an optical code reading device and code reading method for detecting positions.

BACKGROUND ART

Conventionally, there has been a code reading device that reads and encode a part of a plurality of dot marks to provide positional information indicating a position of that part of the dot marks (for example, see Patent Literature (PTL) 1).

CITATION LIST

Patent Literature

[PTL 1]
Japanese Unexamined Patent Application Publication (Translation of PCT Application) No. 2003-529853

SUMMARY OF INVENTION

Technical Problem

However, such a conventional configuration has a problem of high computational complexity.

An object of the present invention is to solve the conventional problem mentioned above and provide a code reading device capable of obtaining code information with a reduced computational complexity.

Solution to Problem

In order to solve the above-mentioned conventional problem, a code reading device according to an aspect of the present invention reads a part of a plurality of dot marks located in a predetermined matrix arrangement displaced in a first direction or a second direction crossing the first direction from virtual lattice points specified by the first direction and the second direction and encodes the read part of the dot marks to provide positional information indicating a position of the part of the dot marks. The code reading device includes a neighbor searching and voting unit configured to, for each of the part of the dot marks, (i) search for at least four neighboring dot marks, (ii) calculate coordinate values of the at least four neighboring dot marks that have been searched for, using each of the part of the dot marks as a reference point, and (iii) vote on the calculated coordinate values of the at least four neighboring dot marks in a two dimensional plane; a direction detecting unit configured to determine the first direction and the second direction from voting results obtained by the neighbor searching and voting unit; an order determining unit configured to determine a raster order for the part of the dot marks based on the first direction and the second direction determined by the direction detecting unit; and a code detecting unit configured to (i) obtain coordinate values of the part of the dot marks, (ii) determine lattice points based on the obtained coordinate values of the part of the dot marks and the raster order, and (iii) detect a relative position of each of the lattice points to a closest dot mark among the part of the dot marks according to the raster order, thereby encoding the read part of the dot marks to provide the positional information.

This makes it possible to detect code information with a less computational complexity than the conventional technology and to make a robust estimate.

It should be noted that these general and specific aspects may be realized by a method.

Advantageous Effects of Invention

With the code reading device according to the present invention, it becomes possible to obtain code information with a reduced computational complexity. Thus, the process of obtaining the code information can be executed by hardware with a small circuit scale and function. Consequently, the size and power consumption of the code reading device can be reduced.

DESCRIPTION OF EMBODIMENT (Underlying Knowledge Forming Basis of the Present Invention)

In relation to the code reading method described in the Background Art section, the inventors have found the following problem.

Figure 4:
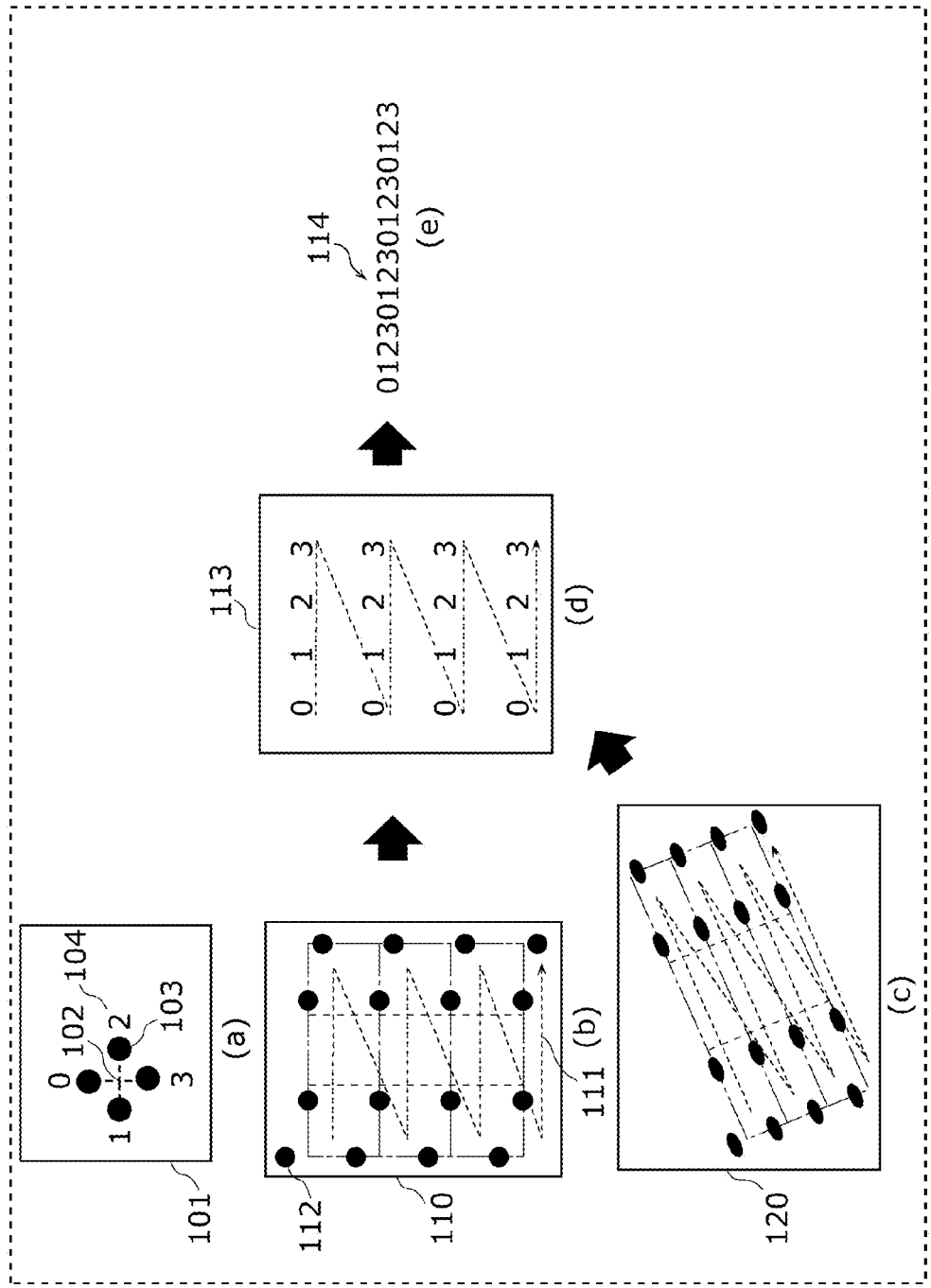
FIG. 4 illustrates an example of encoding dot mark positions.

FIG. 4 illustrates an example of encoding dot mark positions located at a distance from individual lattice points 102 in an arbitrary direction. Here, (a) in FIG. 4 shows a relationship 101 between dot marks 103 and code values 104 indicated by the respective dot marks 103. Then, (b) in FIG. 4 shows a pattern 110 of a plurality of dot marks 112, which is an exemplary arrangement of the plurality of dot marks 112 that are assumed to be arranged in a 4×4 matrix, vertically by horizontally, in a raster order indicated by a dashed arrow 111. Further, (d) in FIG. 4 shows an encoding result 113, which is a result of encoding the individual dot marks in the pattern 110. Finally, a code string 114 is derived.

Additionally, if the relationship falls apart between a camera for reading codes and a plane in which the dot marks expressing the codes are present, a lattice frame necessary for the encoding is three-dimensionally distorted as shown in a pattern 120, for example.

PTL 1 estimates the distortion of the lattice frame by a spatial frequency analysis. PTL 1 carries out a two-dimensional Fourier analysis of the dot marks to detect peak values in a frequency plane and then estimates the distortion of the lattice frame in three dimensions from the detected peak values. Next, the dot marks are rotation-corrected into a space of a distortion-free lattice frame, followed by encoding. However, the conventional configuration described above carries out the Fourier analysis, etc. using many trigonometric functions, thereby increasing the computational complexity. Therefore, when implementing the conventional configuration as hardware, the circuit scale increases.

In order to solve such a problem, a code reading device according to an aspect of the present invention reads a part of a plurality of dot marks located in a predetermined matrix arrangement displaced in a first direction or a second direction crossing the first direction from virtual lattice points specified by the first direction and the second direction and encodes the read part of the dot marks to provide positional information indicating a position of the part of the dot marks. The code reading device includes a neighbor searching and voting unit configured to, for each of the part of the dot marks, (i) search for at least four neighboring dot marks, (ii) calculate coordinate values of the at least four neighboring dot marks that have been searched for, using each of the part of the dot marks as a reference point, and (iii) vote on the calculated coordinate values of the at least four neighboring dot marks in a two dimensional plane; a direction detecting unit configured to determine the first direction and the second direction from voting results obtained by the neighbor searching and voting unit; an order determining unit configured to determine a raster order for the part of the dot marks based on the first direction and the second direction determined by the direction detecting unit; and a code detecting unit configured to (i) obtain coordinate values of the part of the dot marks, (ii) determine lattice points based on the obtained coordinate values of the part of the dot marks and the raster order, and (iii) detect a relative position of each of the lattice points to a closest dot mark among the part of the dot marks according to the raster order, thereby encoding the read part of the dot marks to provide the positional information.

This makes it possible to detect code information with a less computational complexity than the conventional configuration and to make a robust estimate.

Also, for example, the neighbor searching and voting unit may vote on, as the coordinate values, probability density functions having a distribution within a predetermined range from the calculated coordinate values.

Further, for example, the direction detecting unit may search for a plurality of maximal points with a large voting value from the voting results and determine an alignment direction of at least two points out of the maximal points that have been searched for and the reference point, thereby determining the first direction and the second direction.

Moreover, for example, the direction detecting unit may extract four points closest to the reference point from the maximal points that have been searched for, identify two pairs of two points aligned on both sides of the reference point out of the four points and determine alignment directions of the identified two pairs of the two points to be the first direction and the second direction.

Additionally, for example, the direction detecting unit may search for the maximal points with the large voting value by threshold-processing the voting results in the two dimensional plane.

Furthermore, for example, the direction detecting unit may search for the maximal points with the large voting value by filtering the voting results in the two dimensional plane.

Also, for example, the code detecting unit may calculate ideal lattice points, assuming that the ideal lattice points are associated with the raster order and that the part of the dot marks are arranged with a predetermined fixed value; calculate a projective transformation matrix for transforming a coordinate system of the part of the dot marks into a coordinate system of the ideal lattice points, while assuming that the part of the dot marks includes a displacement from the virtual lattice points; perform a projective transformation on coordinates of each of the part of the dot marks using the projective transformation matrix so as to obtain post-transformation coordinates; and detect a relative position of each of the ideal lattice points to a closest dot mark among dot marks indicated by the obtained post-transformation coordinates according to the raster order, thereby encoding the read part of the dot marks to provide the positional information.

Further, for example, the code detecting unit may linearly approximate the part of the dot marks to plural lines of dot marks that are arranged along the first direction and the second direction, according to the raster order of the dot marks determined by the order determining unit, determine points of intersection of straight lines obtained by the linear approximation in the first direction and the second direction to be the lattice points, and detect the relative position of each of the determined lattice points to the closest dot mark according to the raster order, thereby encoding the read part of the dot marks to provide the positional information.

It should be noted that these general and specific aspects may be realized by a method or a program.

The following is a specific description of a code reading device and a code reading method according to one aspect of the present invention, with reference to accompanying drawings.

Incidentally, each embodiment described below will illustrate one specific example of the present invention. The numerical values, shapes, structural elements, steps, the processing order of the steps, etc. shown in the following embodiment are mere examples and therefore do not limit the present invention. Further, among the structural elements in the following embodiment, the one not recited in any independent claim exhibiting the most generic concept will be described as an arbitrary structural element.

Embodiment

Figure 1:
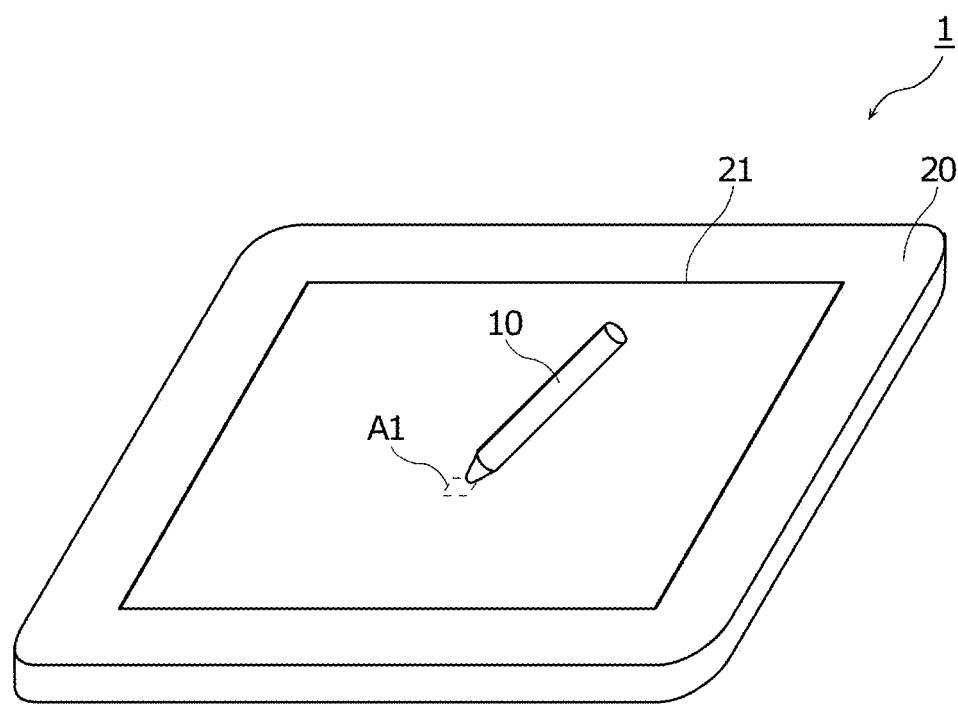
FIG. 1 illustrates a configuration of an input apparatus including a code reading device in an embodiment of the present invention.
Figure 2:
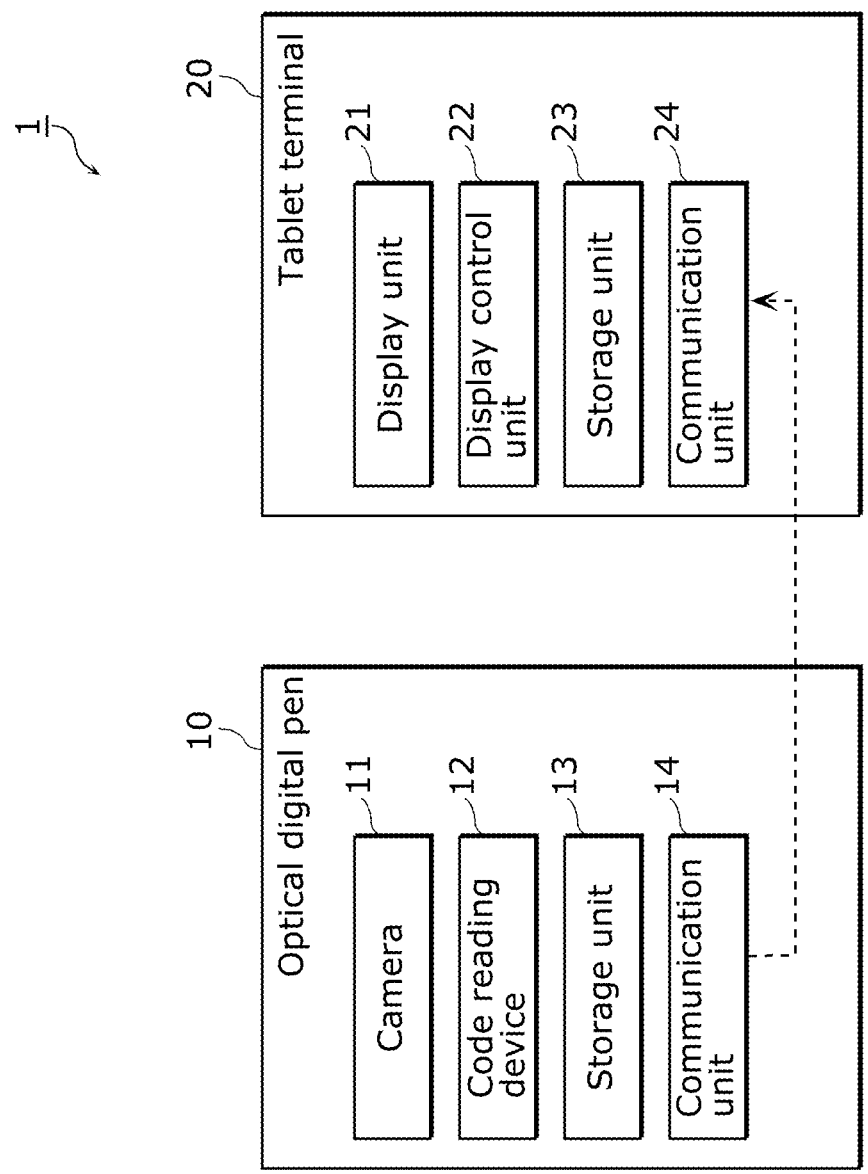
FIG. 2 is a block diagram showing the input apparatus in the embodiment of the present invention.

FIG. 1 illustrates a configuration of an input apparatus 1 including a code reading device 12 in an embodiment of the present invention. FIG. 2 is a block diagram of the input apparatus 1 in the present embodiment.

As shown in FIGS. 1 and 2, the input apparatus 1 has an optical digital pen 10 and a tablet terminal 20.

The optical digital pen 10 is a pen-type terminal that reads a part of a plurality of dot marks (hereinafter, also referred to as "DMs") located in a predetermined arrangement. The optical digital pen 10 includes a camera 11, the code reading device 12, a storage unit 13 and a communication unit 14.

The camera 11 is disposed in the optical digital pen 10 such that its optical axis corresponds to an axis of the optical digital pen 10, and captures and generates an image of an object located in front of a tip of the optical digital pen 10. Also, the camera 11 has a lens that is configured so that, when the tip of the optical digital pen 10 is brought into contact with an object surface, focus is achieved on this object surface, and captures an image of the object surface with which the pen tip is in contact. For example, in FIG. 1, an image of a region A1 at the tip of the optical digital pen 10 is captured. Note that the camera 11 need not be configured so that focus is achieved exactly on the object surface with which the pen tip is in contact. Instead, the camera 11 may be configured so as to obtain the image of the focused object surface as long as the pen tip is within a predetermined range even not in contact with the object surface. Additionally, the camera 11 in the present embodiment may be, for example, an infrared camera capturing only infrared rays outside a visible light wavelength range.

The code reading device 12 reads a part of a plurality of dot marks from the object image captured by the camera 11 and encodes (converts) that part of the dot marks to provide positional information indicated thereby. Incidentally, the dot marks are provided in advance on an object that is designed for drawing on (in the present embodiment, an entire display surface of a display unit 21 of the tablet terminal 20) and located in a predetermined arrangement. The dot marks are arranged in a predetermined matrix arrangement at positions displaced in a first direction or a second direction from virtual lattice points that are specified by the first direction and the second direction. Also, the dot marks are drawn with a material that absorbs infrared rays outside the visible light wavelength range so as not to affect the quality of an image to be displayed by the tablet terminal. Thus, the dot marks in the image captured by the camera 11 have a gain close to 0 (namely, are in black dots). Further, the part of the dot marks whose image is captured by the camera 11 is smaller in number than the plurality of the dot marks provided on the entire display surface of the display unit 21 of the tablet terminal 20. More specifically, the code reading device 12 is a processing unit that is embodied by a processor such as a CPU or a microprocessor, a program for that processor to realize a function as the code reading device 12, or the like. The program is stored in a ROM (Read Only Memory), for example.

Figure 3:
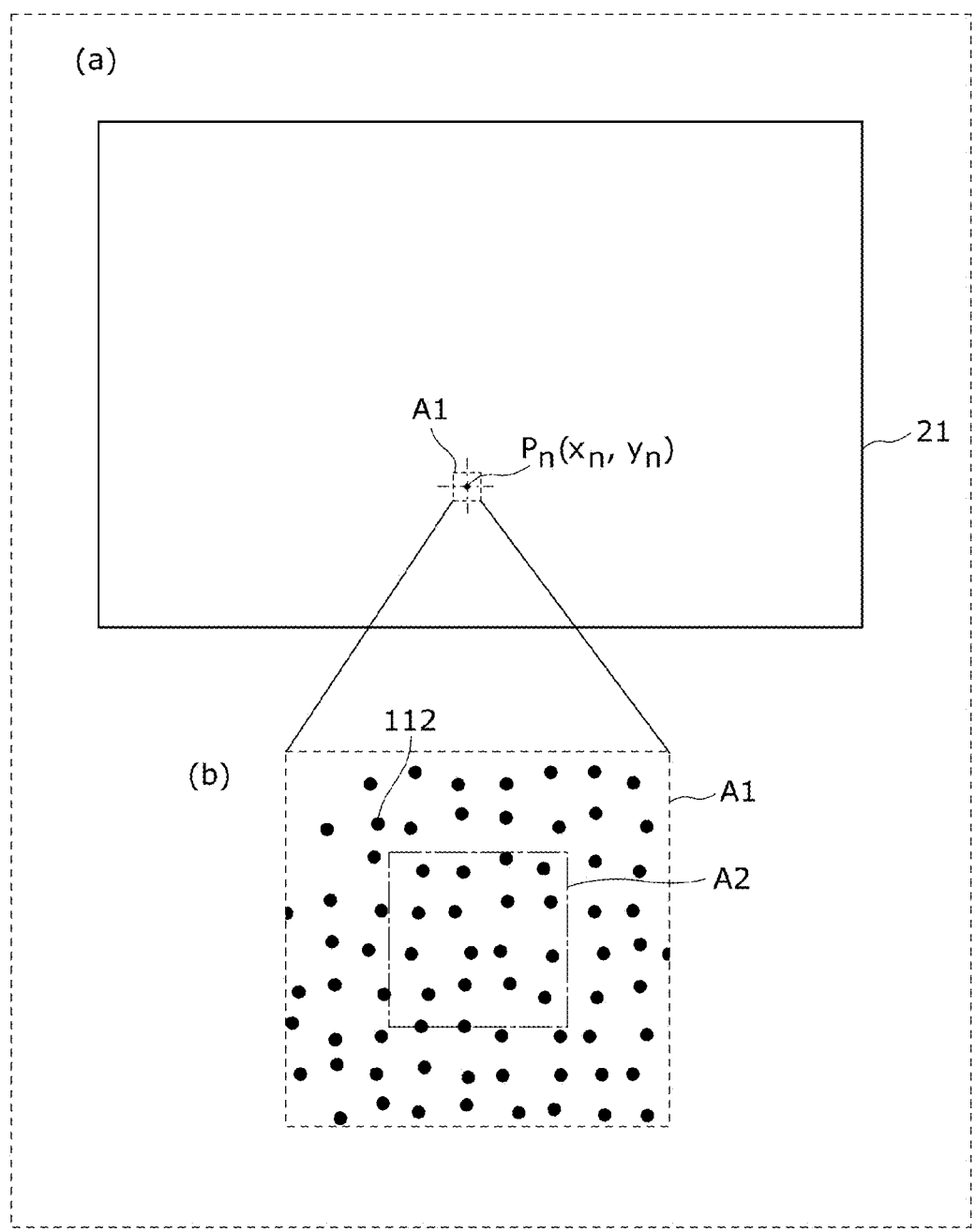
FIG. 3 is a diagram for describing an image of a plurality of dot marks captured by an optical digital pen on a display surface of a display unit of a tablet terminal in FIG. 1.

FIG. 3 is a diagram for describing an image of the plurality of dot marks captured by the optical digital pen 10 on the region A1 in the display surface of the display unit 21 of the tablet terminal 20 in FIG. 1. Here, (a) in FIG. 3 shows a position of the region A1 in the display surface of the display unit 21 of the tablet terminal 20. Then, (b) in FIG. 3 shows an arrangement of the plurality of dot marks in the region A1 whose image is captured by the camera 11.

As shown in (b) of FIG. 3, for example, the size of the region A1 whose image is captured by the camera 11 is set such that an image of substantially 9×9 dot marks can be captured. At this time, the code reading device 12 narrows the captured image of the region A1 down to a region A2 that is in the vicinity of its center and includes 4×4 dot marks, and reads the 4×4 dot marks as the part of the dot marks. In other words, the code reading device 12 reads 4×4 dot marks whose image is captured by the optical digital pen 10 among a large number of dot marks provided on the entire display surface of the display unit 21 of the tablet terminal 20, and encodes the 4×4 dot marks to provide positional information indicating a position on the object for drawing on indicated by the 4×4-dot-mark-arrangement using the method described referring to FIG. 4. It should be noted that an arrangement pattern of the dot marks read by the code reading device 12 is not limited to 4×4 but may have an increased number such as 6×6, 8×8, etc. By increasing the number of dot marks to be read, the positional information obtained by the encoding can be made more redundant and thus less vulnerable to disturbances, so that it becomes possible to identify positions in the display unit 21 of the optical digital pen 10 from the positional information obtained by the encoding. Also, the arrangement pattern of the dot marks need not have a 1 to 1 ratio between the vertical number and the horizontal number of the dot marks but may have other ratios, for example, 3×5, 4×9, etc.

The storage unit 13 is, for example, a RAM (Random Access Memory) that temporarily stores an object image captured by the camera 11, positional information obtained by the encoding performed by the code reading device 12, etc. Further, the storage unit 13 may include a ROM that stores a program executed by the code reading device 12.

The communication unit 14 transmits information to and receives information from the tablet terminal 20. More specifically, the communication unit 14 transmits the positional information stored in the storage unit 13 or the positional information obtained by the encoding performed by the code reading device 12 to the tablet terminal 20. The communication unit 14 transmits information to and receives information from a communication unit 24 of the tablet terminal 20 via wireless communication such as Bluetooth (R) or a wireless LAN.

The tablet terminal 20 is constituted by the display unit 21, a display control unit 22, a storage unit 23 and the communication unit 24.

The display unit 21 displays an image generated by the display control unit 22 and may be, for example, a liquid crystal display, an organic EL display or the like.

The display control unit 22 is a processing unit that is embodied by a processor such as a CPU or a microprocessor, a program for receiving an input based on the positional information transmitted from the optical digital pen 10 and generating an image to be displayed on the display unit 21, or the like. The program is stored in a ROM, for example.

The storage unit 23 is, for example, a RAM that temporarily stores information such as image information indicating an image generated by the display control unit 22, the positional information obtained from the communication unit 24, etc. Further, the storage unit 23 may include a ROM that stores a program executed by the display control unit 22.

The communication unit 24 transmits information to and receives information from the communication unit 14 of the optical digital pen 10 via wireless communication such as Bluetooth (R) or a wireless LAN. More specifically, the communication unit 24 receives the positional information transmitted from the optical digital pen 10. Incidentally, the communication carried out by the communication units 14 and 24 need not be wireless communication but may be wired communication.

Figure 5:
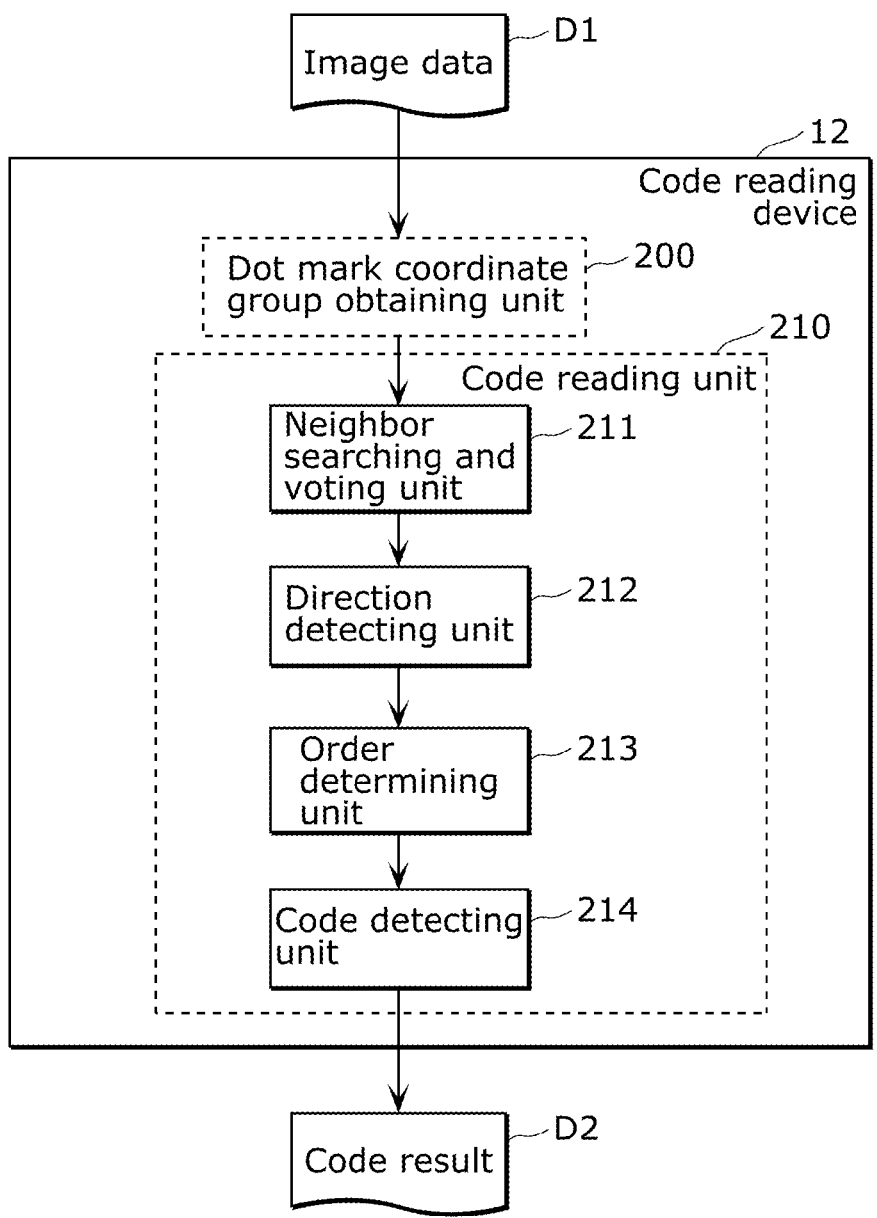
FIG. 5 illustrates a configuration of the code reading device in the embodiment of the present invention.

FIG. 5 illustrates a configuration of the code reading device 12 in the embodiment of the present invention. The code reading device 12 includes a dot mark coordinate group obtaining unit 200 and a code reading unit 210. Further, the code reading unit 210 includes a neighbor searching and voting unit 211, a direction detecting unit 212, an order determining unit 213 and a code detecting unit 214.

The dot mark coordinate group obtaining unit 200 obtains a dot mark coordinate group from 4×4 dot marks in the region A2 in image data D1 indicating an image of 9×9 dot marks captured by a camera or the like. The dot mark coordinate group is composed of coordinates of center positions (hereinafter, referred to as "center coordinates") of respective ones of the 4×4 dot marks in the region A2 detected by an image processing (for example, detection of center coordinates by binarization and labeling, etc.).

When the code reading unit 210 receives the dot mark coordinate group from the dot mark coordinate group obtaining unit 200, it estimates a lattice frame serving as a reference for encoding. The code reading unit 210 carries out the encoding by the method described in FIG. 4 according to a relative position of a closest dot mark to each of a plurality of lattice points specified by the estimated lattice frame.

Code results D2 are code data outputted from the code reading unit 210. These code results D2 are decoded according to a specific law, thereby extracting coordinates Pn (Xn, Yn) on the display surface of the display unit 21 shown in FIG. 3, for example. It should be noted that not only the positional information but also an ID of a terminal for drawing on may be embedded in the code results D2. That is to say, in this case, information capable of identifying the terminal for drawing on is indicated by the arrangement of the dot marks. Moreover, since the terminal ID can be added easily not only to the terminal for drawing on but also the code reading device itself, collaboration is possible while sharing a single terminal for drawing on among a plurality of reading devices in an electronic educational material, a teleconference, etc.

Figure 6A:
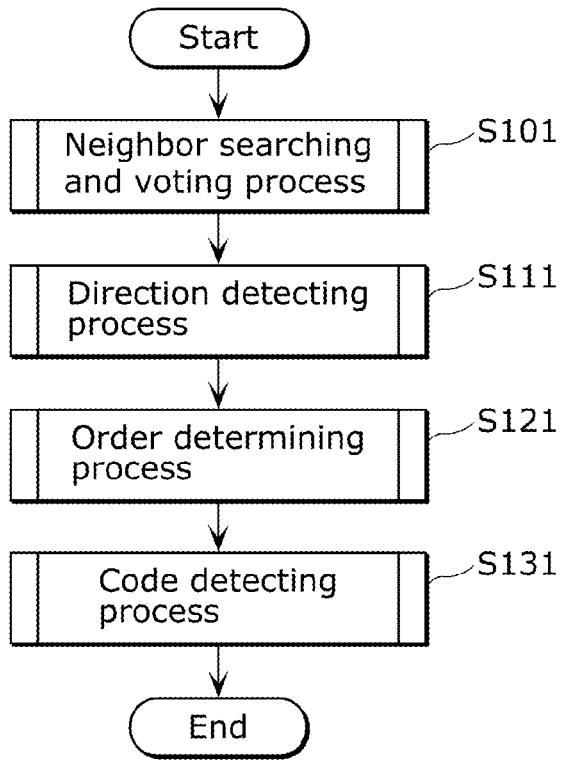
FIG. 6A is a flowchart showing a process carried out by the code reading device in the embodiment of the present invention.

Now, the code reading unit 210 will be described in detail with reference to FIGS. 5, 6A to 6E. FIG. 6A is a flowchart showing a process flow in the present embodiment.

When the neighbor searching and voting unit 211 receives the dot mark coordinate group from the dot mark coordinate group obtaining unit 200, it searches for eight neighboring dot mark positions for each of the center coordinates of the dot marks indicated by that dot mark coordinate group and votes on them in a two dimensional plane (S101).

The direction detecting unit 212 detects a plurality of points having a high voting value from the result of voting in the two dimensional plane processed by the neighbor searching and voting unit 211 and determines a first direction and a second direction based on the detected points (S111). It should be noted that the first direction and the second direction serve as a reference of a raster order for reading the 4×4 dot marks and cross each other.

From the first direction and the second direction determined by the direction detecting unit 212, the order determining unit 213 creates a provisional lattice frame having a position of one of the 4×4 dot marks as a reference. Then, the order determining unit 213 searches for a dot mark closest to each lattice point in the created provisional lattice frame, thereby determining the raster order for processing the 4×4 dot marks (S121).

From the raster order determined by the order determining unit 213 and the dot mark coordinate group obtained by the dot mark coordinate group obtaining unit 200, the code detecting unit 214 estimates a lattice frame serving as a reference for encoding (hereinafter, referred to as a "reference lattice frame") in which 4×4 dot marks are arranged regularly in a lattice pattern. The code detecting unit 214 calculates a transformation matrix (considering the three-dimensional distortion, a projective transformation matrix) from the dot marks to the reference lattice frame. Thereafter, encoding is performed from a difference amount between each lattice point in the reference lattice frame and a value obtained by actual projective transformation of the dot mark (S131).

Figure 6B:
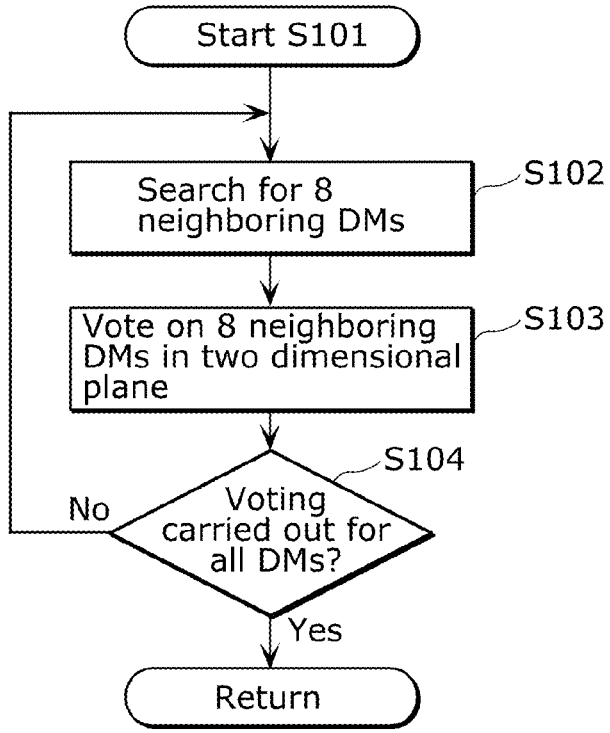
FIG. 6B is a flowchart showing a neighbor searching and voting process in the embodiment of the present invention.

Next, the neighbor searching and voting process (S101) will be described in detail, with reference to FIGS. 6B and 7. FIG. 6B is a flowchart showing a flow of the neighbor searching and voting process in the embodiment of the present invention.

First, when the neighbor searching and voting process (S101) is started, the neighbor searching and voting unit 211 looks at one of the inputted dot marks and searches for eight neighboring dot marks close to the targeted dot mark (S102).

After searching for the eight neighboring dot marks in Step S102, the neighbor searching and voting unit 211 transforms coordinates of the eight neighboring dot marks that have been searched for into those in a coordinate system whose origin corresponds to coordinates of the targeted dot mark, thus voting on the transformed coordinates of the eight neighboring dot marks (S103).

Following the voting in Step S103, the neighbor searching and voting unit 211 determines whether the voting has been carried out for all the dot marks indicated by the inputted dot mark coordinate group (S104).

Then, if the voting is not determined to be carried out for all the dot marks (S104: No), the neighbor searching and voting unit 211 looks at a subsequent dot mark and returns to Step S102. If the voting is determined to be carried out for all the inputted dot marks (S104: Yes), the neighbor searching and voting unit 211 ends the neighbor searching and voting process.

Figure 7:
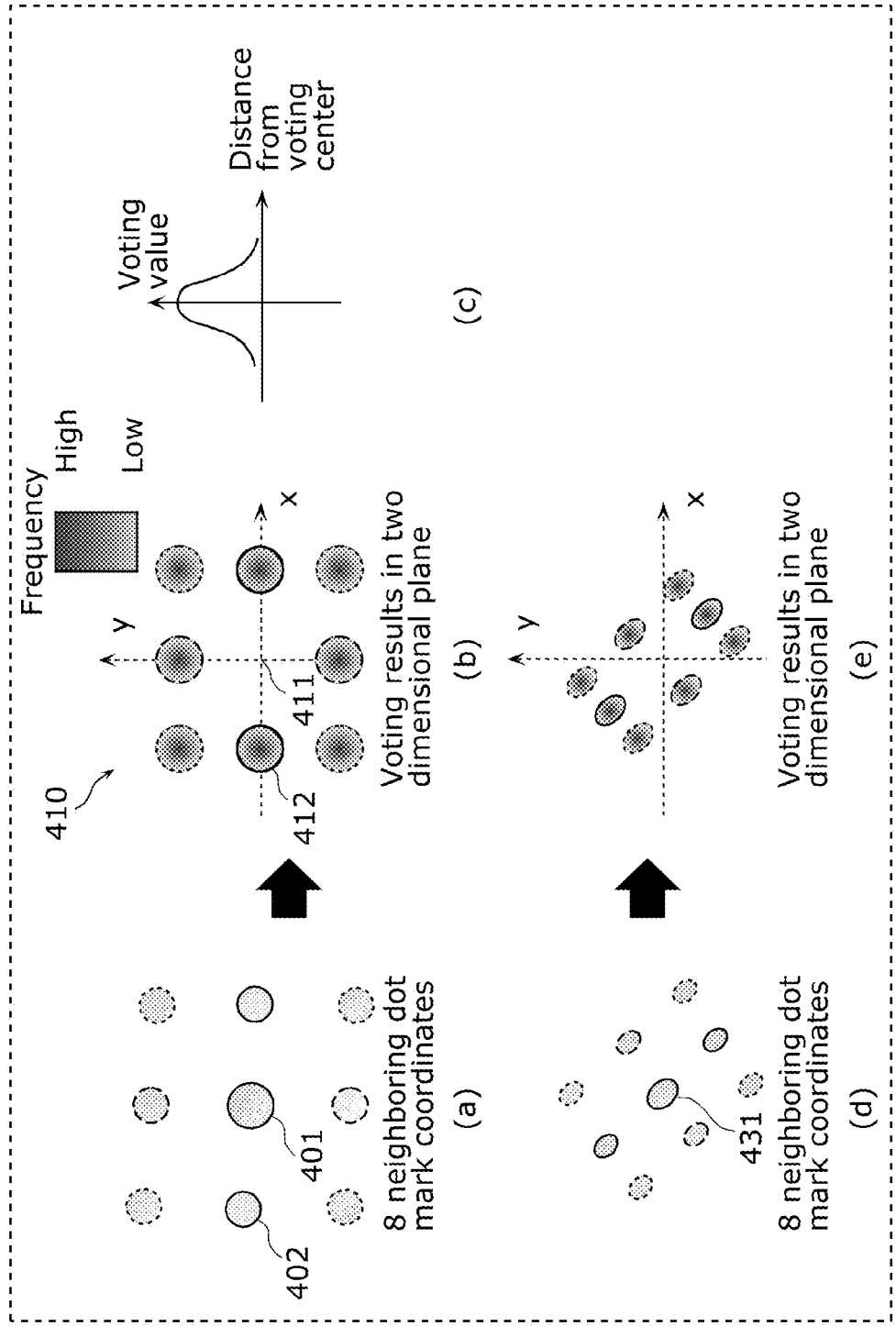
FIG. 7 is a diagram for describing the neighbor searching and voting process carried out by a neighbor searching and voting unit in the code reading device in the embodiment of the present invention.

Referring to FIG. 7, the neighbor searching and voting process will be described further.

FIG. 7 is a diagram for describing a neighbor searching process by the neighbor searching and voting unit 211 in the code reading device 12 in the present embodiment. Here, (a) in FIG. 7 is a part of a dot mark coordinate group of a plurality of dot marks in an image captured at certain timing and shows eight neighboring dot marks in the case where the targeted dot mark is a dot mark 401. The neighbor searching and voting unit 211 searches for eight neighboring dot marks for each of the 4×4 dot marks. Then, the neighbor searching and voting unit 211 calculates coordinate values of the eight neighboring dot marks that have been searched for, with each of the 4×4 dot marks serving as a reference point (namely, an origin). Further, for each of the 4×4 dot marks, the neighbor searching and voting unit 211 votes on the calculated coordinate values of the eight individual neighboring dot marks in a two dimensional plane. Now, (b) in FIG. 7 shows the two dimensional plane after the neighbor searching and voting process is carried out on all the dot marks in the dot mark coordinate group. In (b) of FIG. 7, the voting results are expressed in the two dimensional plane such that their color becomes darker with increasing voting frequency. For example, when looking at the dot mark 401 shown in (a) of FIG. 7, the voting result on a neighboring dot mark 402 to its immediate left is shown as a position 412 at the time of voting a position of the neighboring dot mark 402 relative to the dot mark 401 with respect to an origin 411 of a two dimensional plane 410 shown in (b) of FIG. 7.

Here, (d) in FIG. 7 is a part of a dot mark coordinate group of a plurality of dot marks in an image captured at another timing and shows eight neighboring dot marks in the case where the targeted dot mark is a dot mark 431. Further, (e) in FIG. 7 shows voting results on the two dimensional plane when the eight neighboring dot marks have the relationship as shown in (d) of FIG. 7.

Incidentally, in the neighbor searching and voting process, votes are casted discretely when casted as points, so that cumulative values of the voting results cannot be obtained easily. Thus, the neighbor searching and voting unit 211 may cast votes using, as the coordinate values, probability density functions having a distribution within a predetermined range from the calculated coordinate values. In this case, the coordinate values are displaced mainly due to code patterns and optical distortions. Considering the dot marks stochastically, those code patterns and optical distortions have certain regularity and can be dealt with by probability density expression. For example, using a table as shown in (c) of FIG. 7, for coordinates of one dot mark, the dot mark existence probability may be expressed as a normal distribution from the center of the dot mark. In this case, for coordinates of one dot mark, voted on is a distribution (function) that has the largest voting value at the center and an outwardly decreasing voting value within a predetermined range with respect to center coordinates of this dot mark, for example, a normal distribution. In this manner, by voting on the function having a distribution within a predetermined range, the discrete voting can be reduced, making it easier to obtain the cumulative values of the voting results. In other words, the cumulative value of the voting result is largest at a position to which coordinates that are voted on are located closest and in which the number of such coordinates is largest. It should be noted that the "voting value" here refers to a value obtained by cumulating all the neighboring dot marks that have been searched for with respect to each of the plurality of dot marks. Incidentally, to "cumulate" here may also be expressed as to "sum," "add" or "accumulate." In other words, to "vote on" may also be expressed as any of to "cumulate," "sum," "add" and "accumulate."

Here, the advantage of the estimation by voting lies in the utilization of the constraint that the positional relationship between one dot mark and another is basically an evenly spaced lattice-like arrangement, though dot marks may be slightly displaced from a predetermined lattice frame for expressing signs. In other words, in the estimation by voting, if eight neighboring dot marks of each of the plurality of dot marks in the dot mark coordinate group are voted on, they are voted on at substantially the same positions. Thus, even when the dot mark coordinate group was obtained in a two-dimensionally or three-dimensionally distorted state due to an image capturing condition of the camera 11 in the optical digital pen 10, it would be possible to obtain intended voting results as shown in (b) and (e) of FIG. 7.

Also, even when an erroneous dot mark including noise or the like was detected and inputted, it would be possible to make a robust estimation capable of statistically removing the erroneous dot mark. Further, by casting votes using the probability density, a vicinity of the center will exhibit a high probability (voting value), thus achieving an effect of absorbing the dot mark displacement from a predetermined lattice frame for expressing signs, a measuring error of the center of a dot mark, etc.

Figure 6C:
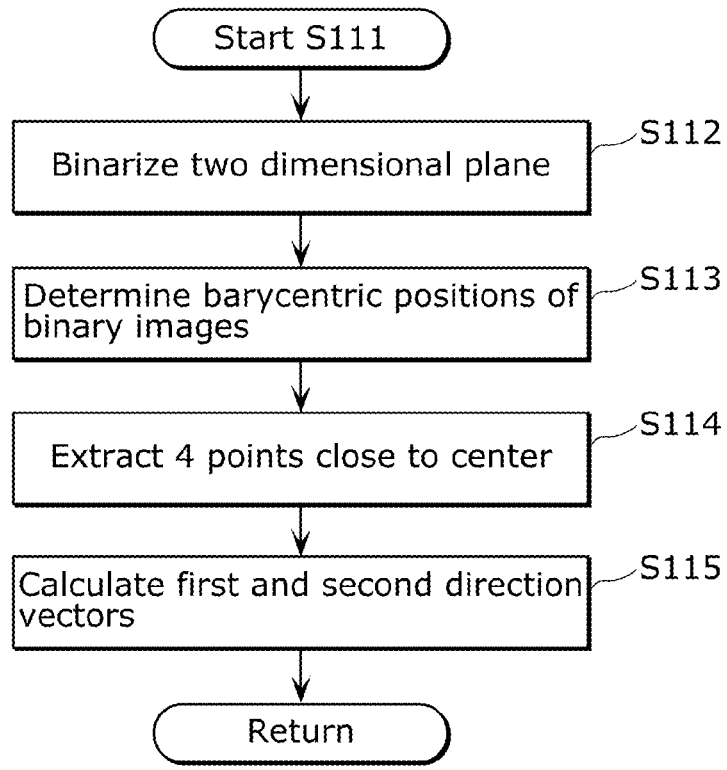
FIG. 6C is a flowchart showing a direction detecting process in the embodiment of the present invention.
Figure 8:
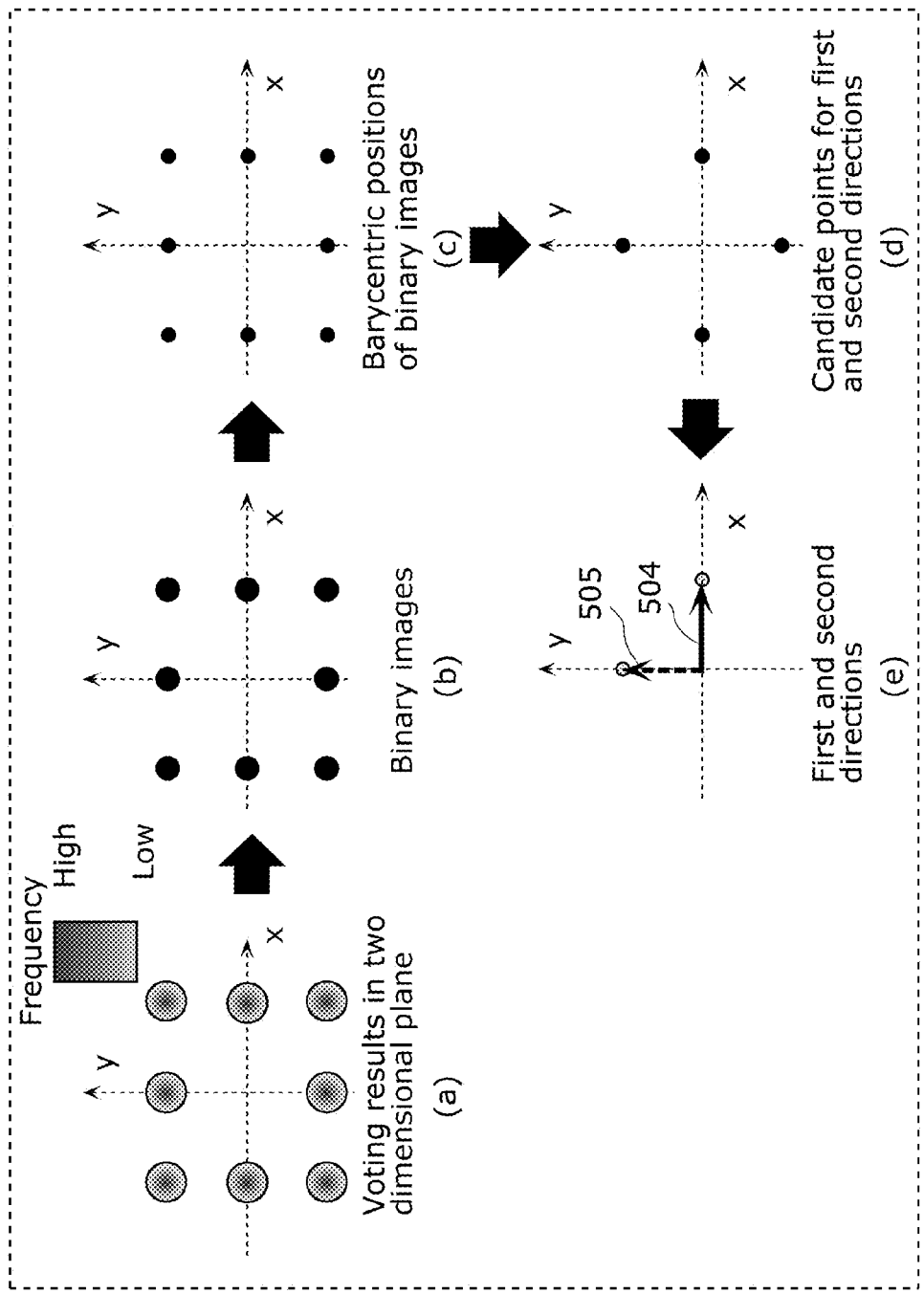
FIG. 8 is a diagram for describing the direction detecting process carried out by a direction detecting unit in the code reading device in the embodiment of the present invention.

Next, the direction detecting process (S111) will be described in detail, with reference to FIGS. 6C and 8. FIG. 6C is a flowchart showing a flow of the direction detecting process in the embodiment of the present invention. FIG. 8 illustrates the direction detecting process (S111), in which (a) shows voting results in the two dimensional plane, (b) shows binary images, (c) shows barycentric positions of the binary images, (d) shows candidate points for determining a first direction and a second direction, and (e) shows a first direction vector 504 and a second direction vector 505.

First, when the direction detecting process (S111) is started, the direction detecting unit 212 carries out a threshold processing to binarize the voting results on the two dimensional plane (S112). At this time, the threshold may be a fixed value that has been adjusted, or the binarization may be carried out utilizing the discriminant analysis method (the Ohtsu's method), the p-tile method (X % of the cumulative frequency of a histogram of the voting values is set as the threshold) or the like. Also, since most of the voting results on the two dimensional plane are in a region with zero voting value, it may be possible to automatically determine the threshold while excluding the region with zero voting value. For example, the voting results on the two dimensional plane as shown in (a) of FIG. 8 are binarized using a certain threshold to achieve results expressed as (b) of FIG. 8.

After the binarization, the direction detecting unit 212 identifies individual regions by image processing labeling (region splitting method) or the like and calculates barycentric positions of these individual regions for the purpose of estimating a vicinity of a peak value of the voting values (S113). More specifically, the direction detecting unit 212 identifies a plurality of blackened regions shown in (b) of FIG. 8 and calculates the barycentric position of each of the blackened regions to obtain the positions shown in (c) of FIG. 8, for example.

After calculating the barycentric positions in Step S113, the direction detecting unit 212 searches for four points close to the center (i.e., the origin (reference point)) of the two dimensional plane and uses them as candidate points for determining the first direction and the second direction (S114). For example, among the eight barycentric positions shown in (c) of FIG. 8, four barycentric positions close to the center of the two dimensional plane are indicated as four points shown in (d) in FIG. 8.

Following the calculation of the candidate points for determining the first direction and the second direction, the direction detecting unit 212 calculates two pairs of two points from the combination of the four points, determines a first direction pair and a second direction pair, and calculates a first direction vector and a second direction vector from the first direction pair and the second direction pair, respectively (S115). For example, when four points indicated in (d) of FIG. 8 are given, the direction detecting unit 212 calculates, for each of the four points, mean coordinates of one point and another point out of the remaining three points. At this time, if a pair whose mean coordinates are closest to the center is selected, that pair can be determined to be the first direction pair or the second direction pair. Accordingly, the second direction vector 505 may be determined based on the pair whose coordinates have a greater absolute value of a y component, and the first direction vector 504 may be determined based on the remaining pair, for example. It should be noted that, in this case, the first direction may be determined to be a horizontal direction and the second direction may be determined to be a vertical direction.

In short, in the direction detecting process, the direction detecting unit 212 searches for a plurality of maximal points with a large voting value from the voting results in the neighbor searching and voting process and determines an alignment direction of at least two points out of the maximal points that have been searched for and the center (origin (reference point)) of the two dimensional plane, thereby determining the first direction and the second direction. More specifically, the direction detecting unit 212 extracts four points closest to the center (origin (reference point)) on the two dimensional plane from the maximal points that have been searched for, identifies two pairs of two points aligned on both sides of the center of the two dimensional plane out of the four points, and determines the alignment directions of the identified two pairs of the two points to be the first direction and the second direction, respectively.

Although the maximal values of the voting values (the candidate points for detecting the first direction and the second direction) have been determined using the binarization and labeling by the threshold processing, how to determine the maximal values of the voting values is not limited to the above but may be a method of determining the maximal values by another filtering using a maximum filter or the like. Conversely, after determining the candidate points for detecting the first direction and the second direction, it may also be possible to use them as initial values and precisely determine the positions of the maximal values by filtering using a maximum filter or the like.

Figure 6D:
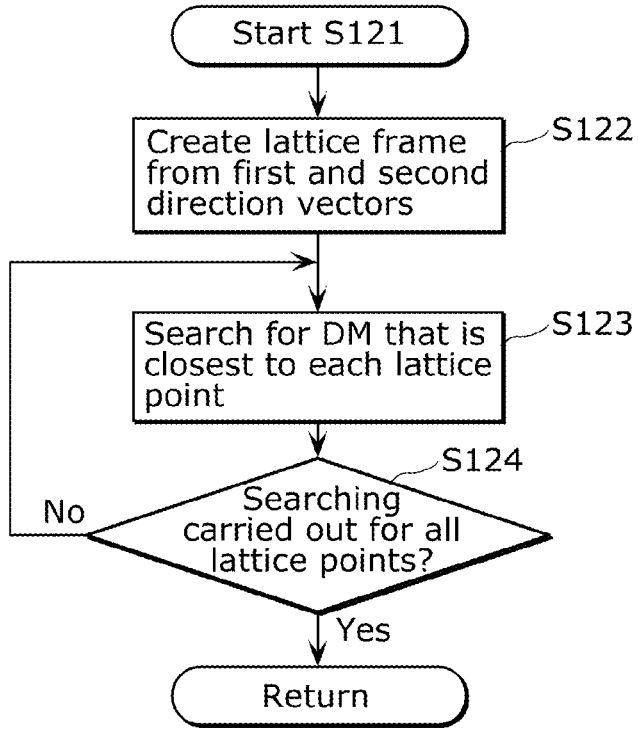
FIG. 6D is a flowchart showing an order determining process in the embodiment of the present invention.
Figure 9:
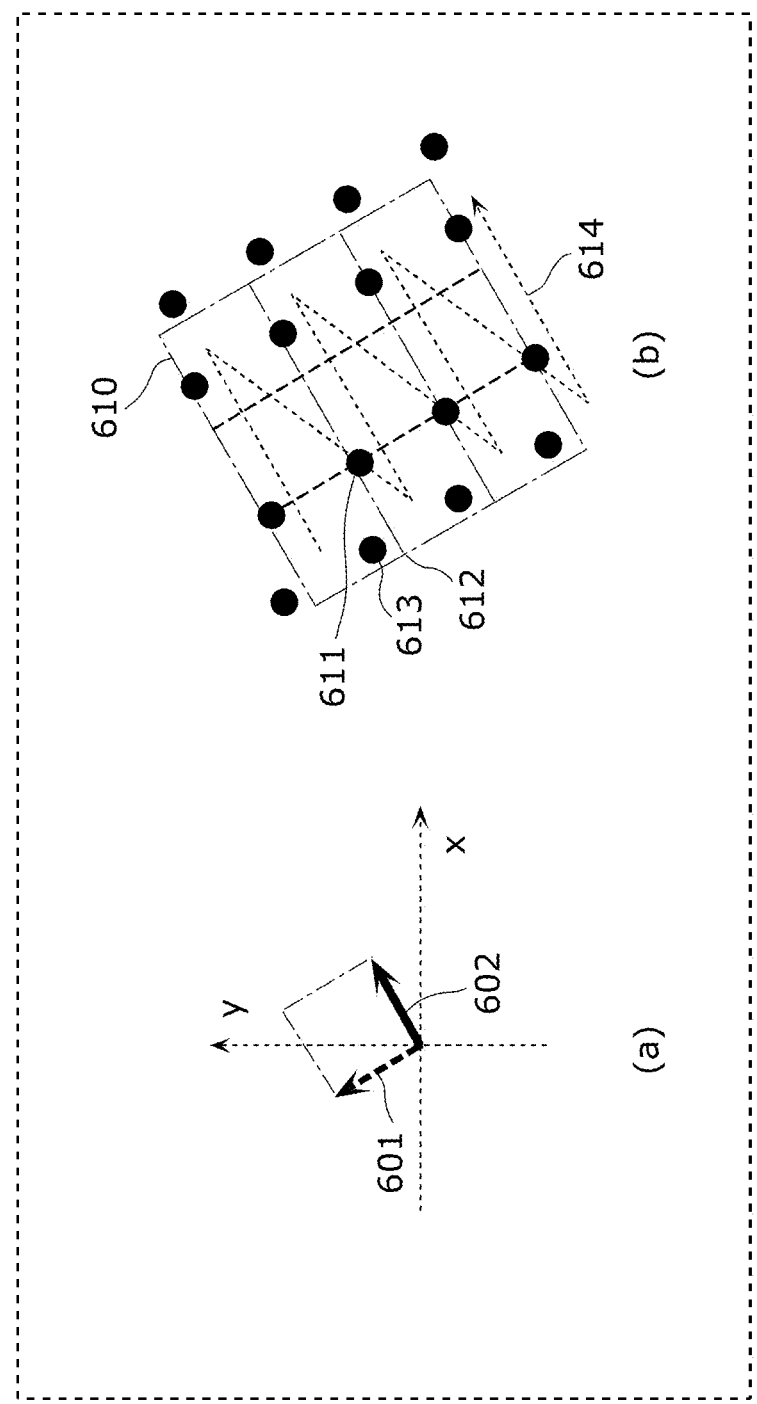
FIG. 9 is a diagram for describing the order determining process carried out by an order determining unit in the code reading device in the embodiment of the present invention.

Next, the order determining process (S121) will be described in detail, with reference to FIGS. 6D and 9. FIG. 6D is a flowchart showing a flow of the order determining process in the embodiment of the present invention. FIG. 9 illustrates the order determining process (S121), in which (a) of FIG. 9 shows a second direction vector 601 and a first direction vector 602, (b) of FIG. 9 shows a provisional lattice frame 610 that is determined by the order determining process and a dashed arrow 614 indicating a raster order.

First, when the order determining process (S121) is started, the order determining unit 213 utilizes the second direction vector 601 and the first direction vector 602 that have been determined in the direction detecting process and creates a provisional lattice frame with reference to a certain dot mark (S122). For example, when the reference of the certain dot mark is a dot mark 611 in (b) of FIG. 9, the provisional lattice frame 610 is created from the second direction vector 601 and the first direction vector 602 shown in (a) of FIG. 9.

After creating the provisional lattice frame 610, the order determining unit 213 searches for a dot mark that is closest to a lattice point in the provisional lattice frame 610 according to the raster order on the provisional lattice frame 610 (S123). For example, the dot mark that is closest to the lattice point 612 is a dot mark 613, and when the raster order is defined by the dashed arrow 614, the dot mark 613 is processed in the order immediately before the dot mark 611.

Following the searching for the dot mark closest to the lattice point, the order determining unit 213 determines whether the searching has been carried out for all the lattice points (S124). If the searching has not been determined to be carried out for all the lattice points (S124: No), the order determining unit 213 returns to Step S123 to perform the same processing also on the remaining lattice points. If the searching has determined to be carried out for all the lattice points (S124: Yes), the order determining unit 213 ends the order determining process. In this way, the order determining unit 213 determines the raster order for the 4×4 dot marks based on the first direction and the second direction detected by the direction detecting unit 212.

Although the raster order for the dot marks has been defined by the dashed arrow 614, there is no limitation to this order. Further, even when a camera capturing an image of the dot marks is rotated in 90-degree increments about its optical axis, it is still difficult to determine its orientation from the alignment of the dot marks. Therefore, in practice, it may be possible to adopt a method of preparing about four raster orders that are rotated in 90-degree increments, decoding encoded values in each of the four raster orders, and taking the most effective information among the decoded information (in other words, the information that is correctly decoded as positional information).

Figure 6E:
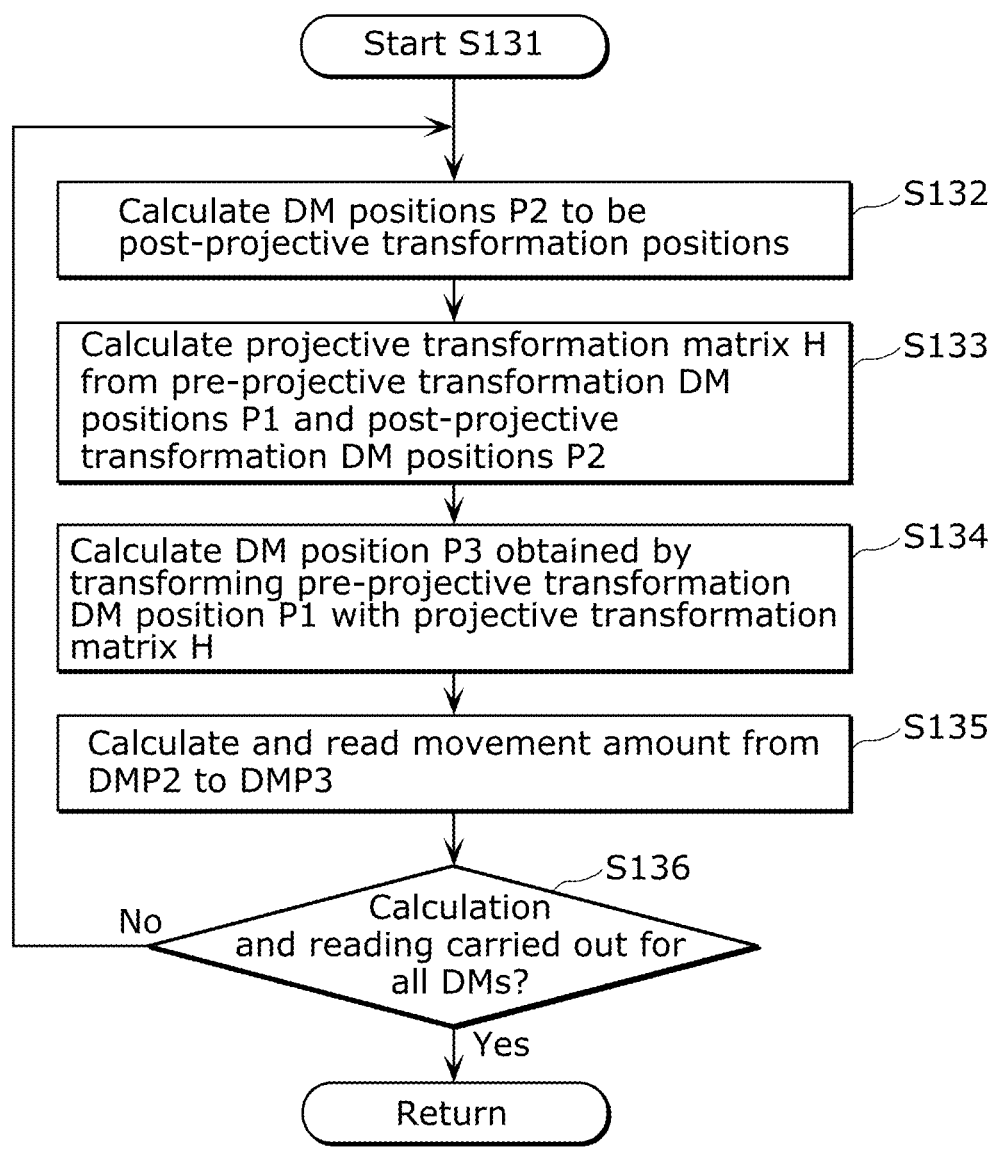
FIG. 6E is a flowchart showing a code detecting process in the embodiment of the present invention.
Figure 10:
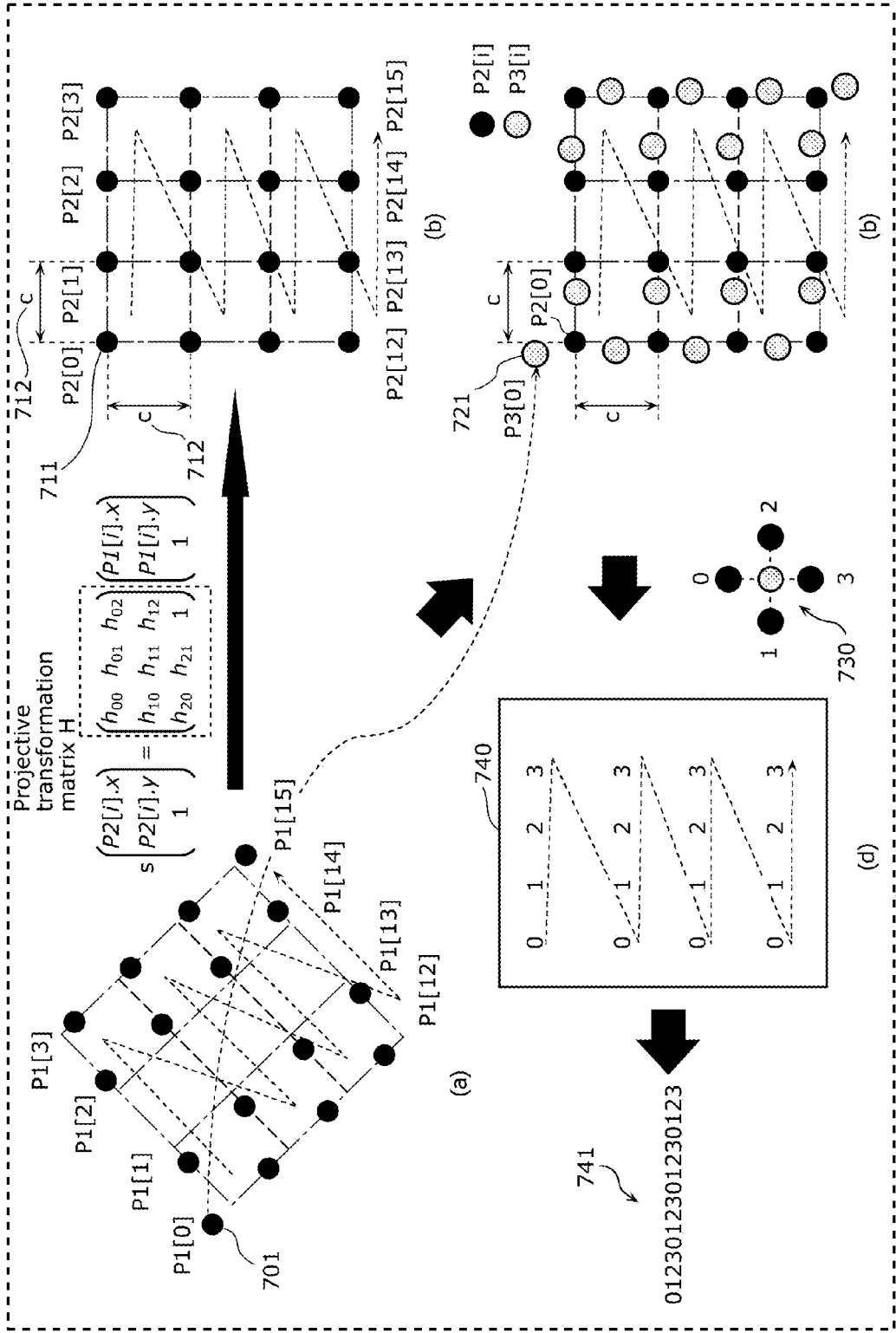
FIG. 10 is a diagram for describing the code detecting process carried out by a code detecting unit in the code reading device in the embodiment of the present invention.
Figure 11:
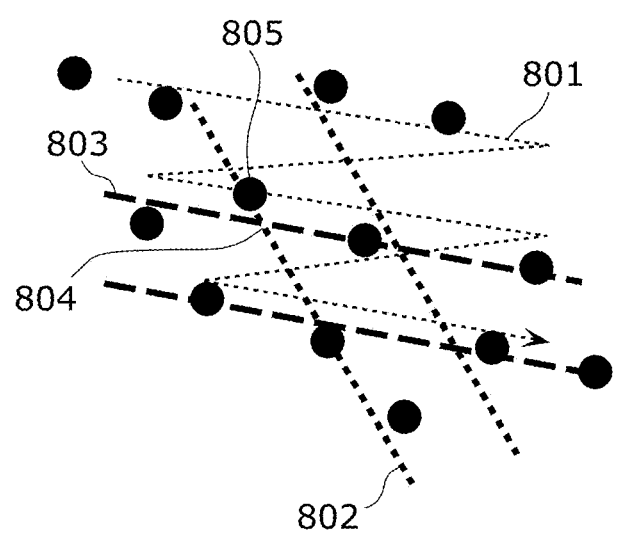
FIG. 11 is a diagram for describing the code detecting process carried out by a code detecting unit in a code reading device in Variation (1).

Next, the code detecting process (S131) will be described in detail, with reference to FIGS. 6E and 10. FIG. 6E is a flowchart showing a flow of the code detecting process in the embodiment of the present invention. FIG. 10 illustrates the code detecting process (S131), in which (a) shows a raster order and dot marks that have been detected. Further, (b) in FIG. 10 shows a state where a plurality of dot marks having no rotational distortion are arranged ideally in a horizontal direction and a vertical direction with a fixed value 712. Also, (c) in FIG. 10 shows displacement of dot marks obtained by projective transformation of a plurality of dot marks arranged in the raster order from the ideally arranged dot marks. Additionally, (d) in FIG. 10 shows results of encoding the individual dot marks.

First, when the code detecting process (S131) is started, the code detecting unit 214 calculates, from the dot marks arranged in the raster order (which are defined as pre-projective transformation DM positions P1), corresponding DMs that have no rotational distortion and are arranged ideally in the horizontal and vertical directions with the fixed value 712 (which are defined as post-projective transformation DM positions P2) (S132). In other words, the code detecting unit 214 calculates the DM positions P2, which are dot mark positions to serve as post-projective transformation positions. Here, the first direction and the second direction detected by the direction detecting unit 212 correspond to the horizontal direction and the vertical direction, respectively.

If there are at least four points of the DM positions P1 and the DM positions P2 that have been brought into correspondence with each other in the raster order, the code detecting unit 214 calculates a projective transformation matrix H for performing projective transformation from the DM positions P1 to the DM positions P2 using a pseudo inverse matrix or the like (S133). An exemplary projective transformation matrix H can be expressed by a 3×3 matrix as shown in Formula 1 below.

[Formula 1]

$$\begin{pmatrix} h_{00} & h_{01} & h_{02} \\ h_{10} & h_{11} & h_{12} \\ h_{20} & h_{21} & 1 \end{pmatrix} \quad \text{(Formula 1)}$$

Thus, the projective transformation formula is Formula 2 below.

[Formula 2]

$$s \begin{pmatrix} P2[i].x \\ P2[i].y \\ 1 \end{pmatrix} = \begin{pmatrix} h_{00} & h_{01} & h_{02} \\ h_{10} & h_{11} & h_{12} \\ h_{20} & h_{21} & 1 \end{pmatrix} \begin{pmatrix} P1[i].x \\ P1[i].y \\ 1 \end{pmatrix} \quad \text{(Formula 2)}$$

At this time, the code detecting unit 214 may calculate the projective transformation matrix by a nonlinear least square error or the like instead of the method using the pseudo inverse matrix.

Here, for example, when looking at a dot mark 701 (P1[0]) located at the DM position P1, a corresponding dot mark located at the DM position P2 is a dot mark 711 (P2[0]).

After calculating the projective transformation matrix H, the code detecting unit 214 carries out projective transformation on the DM positions P1 with the projective transformation matrix H and, as a result, obtain DM positions P3 (S134). Now, for example, a dot mark obtained by actually transforming the dot mark 701 (P1[0]) located at the DM position P1 with the projective transformation matrix H is a dot mark 721 (P3[0]) at the DM position P3.

Following the calculation of the DM position P3, relative positions of the dot marks at the DM positions P3 to the dot marks at the DM positions P2 that have no rotational distortion and are arranged ideally in the horizontal direction and the vertical direction with the fixed value 712 are determined and encoded (S135). For example, when looking at the dot mark 721 (P3[0]) from the dot mark 711 (P2[0]), the dot mark 721 is located above the dot mark 711. Thus, by using a relationship 730 between DM shifting directions and code values, the code values are derived to be 0. In this manner, a result 740 of encoding the individual dot marks is obtained as shown in FIG. 10. Finally, the individual code values are arranged in the raster order, so that a code string 741 is outputted.

In short, the code detecting unit 214 calculates coordinates of ideal lattice points that are associated with the raster order and arranged with a predetermined fixed value. Then, the code detecting unit 214 calculates the projective transformation matrix H for transforming each of the 4×4 dot marks into the coordinates of the ideal lattice points corresponding to the raster order of that dot mark. Thereafter, the code detecting unit 214 determines the relative position by comparing the coordinates obtained by projective transformation of coordinates of a part of the dot marks with the coordinates of the ideal lattice points for those dot marks. Then, the code detecting unit 214 determines the positions of the determined 4×4 dot marks relative to their lattice points in the raster order, thereby encoding the read 4×4 dot marks to provide the positional information thereof.

When calculating the projective transformation matrix H, the DM positions P1, which are positions of the pre-projective transformation dot marks, are assumed to include some error, and then a point having no error with respect to the DM position P1 is calculated, followed by the calculation as the projective transformation from the point having no error. Accordingly, although the present embodiment has explained that the projective transformation matrix H for the projective transformation from the points including a lattice point displacement (i.e., points including an error) to the DM positions P2 is calculated before the projective transformation, a matrix transformation from the points including no lattice point displacement to the DM positions P2 is performed in practice. In the case of assuming that the error is included when calculating the projective transformation matrix as above, it all comes down to the optimization problem of determining a parameter minimizing the error. The projective transformation matrix may be calculated by a generally known least squares method or using a RANSAC (RANdom SAmple Consensus) algorithm.

The above description has been directed to a processing carried out by the code reading device 12 in the present embodiment.

As described above, the code reading device according to the present invention does not make a Fourier analysis, etc. unlike conventional devices. Therefore, the code information can be detected with a reduced computational complexity. Also, since the lattice points are estimated by voting, statistically correct estimation would be possible even when the dot mark coordinate group was obtained in a two-dimensionally or three-dimensionally distorted state due to an image capturing condition of the camera or even when an erroneous dot mark including noise or the like was inputted. In other words, it would be possible to make a robust estimation.

(Variations)

Although the description has been based on the above embodiment, it is needless to say that the present invention is by no means limited to the above embodiment. The following cases will also fall within the scope of the present invention.

(1)

The embodiment described above has used the projective transformation matrix in the code detecting process. However, there is no limitation to this. For example, in FIG. 8, the dot marks arranged in the order of dashed arrow 801 indicating the raster order are linearly approximated in each of the first and second directions, and the linearly-approximated lattice points may be used as a reference point for the encoding. In other words, if the raster order is determined, it is possible to specify the first and second directions, which are directions in which the dot marks are arranged. Therefore, the lattice points may be determined by linear approximation in each of rows and columns of the dot marks arranged in a matrix along the first and second directions. In short, as long as the coordinate values of a part of the dot marks and the raster orders determined for these dot marks are specified, it may be possible to estimate the lattice points from the relationship between the coordinate values of the part of the dot marks and the raster orders without any limitation to the projective transformation using the projective transformation matrix.

When the lattice points are estimated, a dot mark 805 that is looked at from a lattice point 804 in a lattice frame constituted by a linear approximation result 802 along a longitudinal direction and a linear approximation result 803 along a transverse direction is, for example, upwardly displaced and thus may be assigned a code value of 0.

In other words, the code detecting unit 214 may linearly approximate the 4×4 dot marks to plural lines of dot marks that are arranged along the first direction and the second direction according to the raster order of the dot marks determined by the order determining unit 213, determine points of intersection of straight lines obtained by the linear approximation in the first and second directions as lattice points, and detect a relative position of each of the determined lattice points to the closest dot mark according to the raster order, thereby encoding the read 4×4 dot marks to provide their positional information.

(2)

Also, in the input apparatus 1 according to the above embodiment, the code reading device 12 is included in the optical digital pen 10. However, the code reading device 12 may be included in the tablet terminal 20, instead. In this case, the communication unit 14 transmits the image data D1 indicating an image captured by the camera 11 of the optical digital pen 10 to the tablet terminal 20. Then, the code reading device included in the tablet terminal 20 calculates the code results D2 from the image data D1 mentioned above. Of course, the code reading device may be configured as a device separate from the tablet terminal 20. In this case, since configurations such as a processor can be omitted from the optical digital pen 10, it is possible to minimize the power consumption of the optical digital pen 10. On the other hand, since the image data D1, which have a larger data size than the code results D2, have to be transmitted to an apparatus including the code reading device, it will take longer to forward the image data D1 compared with the above embodiment.

Further, it may be also possible to provide the input apparatus whose tablet terminal 20 has a mere function of the code reading unit 210 of the code reading device 12 and whose optical digital pen 10 has a mere function of the dot mark coordinate group obtaining unit 200. When the input apparatus is configured as described above, coordinate group data obtained by transforming the image data D1 into the dot mark coordinate group in the optical digital pen are transmitted to the tablet terminal. In this way, the coordinate group data that have been transformed to have a smaller data size than the image data D1 are transmitted, so that a shorter forwarding time is needed compared with the case of forwarding the image data D1. Moreover, the processing amount by the optical digital pen consists only of that by the dot mark coordinate group obtaining unit 200 and is thus smaller than that in the embodiment described above. Accordingly, it is possible to lower the capability of the processor and reduce the power consumption thereof compared with the case in the embodiment described above.

(3)

Further, in the input apparatus 1 according to the embodiment described above, the object for drawing on is a display surface of the display unit 21 of the tablet terminal 20, and this display surface is provided with a plurality of dot marks. However, there is no limitation to the above, and the object for drawing on may be a sheet of paper provided with a plurality of dot marks. In the case where the object for drawing on is a sheet of paper or the like, an ID for identifying a document format that is printed in advance on the sheet of paper may be embedded in the code results D2 to be obtained. When the document format is identified in this way, the contents described in the document having that format can be converted to data.

(4)

Further, the tablet terminal 20 of the input apparatus 1 according to the embodiment or variations described above may be an information terminal such as a PC (Personal Computer).

(5)

Additionally, an ID for individual recognition can be easily added also to the code reading device itself on software. This makes it possible to distinguish information about who has written what, which cannot be realized by any pens of an electromagnetic induction type or a resistive film type. For example, when a plurality of users write with a pen on a tablet terminal displaying a meeting material, characters of their handwritten text can be displayed with different colors corresponding to the individual users, making it easier to later distinguish who has written the text and convert the text into an electronic form.

(6)

The present invention may be a method for executing an application disclosed by processing procedures described in the above embodiment. Also, the present invention may be a computer program including a program code causing a computer to operate according to the processing procedures.

(7)

The present invention can be implemented also as an LSI for controlling the code reading device described in the above embodiment. Such an LSI can be realized by integrating individual functional blocks such as the neighbor searching and voting unit 211, the direction detecting unit 212, etc. Each of these functional blocks may be formed as a single chip, or a part or all of these functional blocks may be formed as a single chip.

Here, the LSI has been mentioned. However, it is sometimes referred to as an IC, a system LSI, a super LSI or an ultra LSI depending on its integration degree.

Further, a technique for providing an integrated circuit is not limited to LSIs but may be a dedicated circuit or a general purpose processor. It may also be possible to utilize an FPGA (Field Programmable Gate Array) that can be programmed after the LSI production and a reconfigurable processor that can reconfigure the connection and settings of a circuit cell inside the LSI.

Needless to say, if the development of a semiconductor technology or a separate technology derived therefrom brings about any circuit integration technology to replace the LSI, such a circuit integration technology may be used to integrate the functional blocks and members. There is a possibility that such a circuit integration technology can be achieved by a biotechnology application or the like.

(8)

The above-described embodiment and the above-described variations may be combined individually.

INDUSTRIAL APPLICABILITY

The code reading device according to the present invention is useful because it obtains code information with a reduced computational complexity, thus making it possible to reduce the size and power consumption of the code reading device. For example, an optical digital pen or the like that estimates the coordinates of a pen tip from the code information allows the miniaturization of a pen itself.

REFERENCE SIGNS LIST

1 Input apparatus
10 Optical digital pen
11 Camera
12 Code reading device
13 Storage unit
14 Communication unit
20 Tablet terminal
21 Display unit
22 Display control unit
23 Storage unit
24 Communication unit
101 Relationship
102 Lattice point
103 Dot mark
104 Code value
110 Pattern
111 Dashed arrow
112 Dot mark
113 Encoding result
114 Code string
120 Pattern
200 Dot mark coordinate group obtaining unit
210 Code reading unit
211 Neighbor searching and voting unit
212 Direction detecting unit
213 Order determining unit
214 Code detecting unit
401, 431, 611, 613, 701, 711, 721, 805 Dot mark
402 Neighboring dot mark
410 Two dimensional plane
411 Origin
412 Position
504, 602 First direction vector
505, 601 Second direction vector
610 Provisional lattice frame
612, 804 Lattice point
614, 801 Dashed arrow
712 Fixed value
730 Relationship
740 Encoding result
741 Code string 802, 803 Linear approximation result
D2 Code result
P1, P2, P3 DM Position

The invention claimed is:

1. A code reading device that reads a part of a plurality of dot marks located in a predetermined matrix arrangement displaced in a first direction or a second direction crossing the first direction from virtual lattice points specified by the first direction and the second direction and converts the read part of the dot marks to positional information indicating a position of the part of the dot marks, the device comprising:
   a neighbor searching and voting unit configured to, for each of the part of the dot marks, (i) search for at least four neighboring dot marks, (ii) calculate coordinate values of the at least four neighboring dot marks that have been searched for, using each of the part of the dot marks as a reference point, and (iii) accumulate the calculated coordinate values of the at least four neighboring dot marks in a two dimensional plane;
   a direction detecting unit configured to determine the first direction and the second direction from accumulation results obtained by the neighbor searching and voting unit;
   an order determining unit configured to determine a raster order for the part of the dot marks based on the first direction and the second direction determined by the direction detecting unit; and
   a code detecting unit configured to (i) obtain coordinate values of the part of the dot marks, (ii) determine lattice points based on the obtained coordinate values of the part of the dot marks and the raster order, and (iii) detect a relative position of each of the lattice points to a closest dot mark among the part of the dot marks according to the raster order, thereby converting the read part of the dot marks to the positional information.

2. The code reading device according to claim 1, wherein the neighbor searching and voting unit is configured to accumulate, as the coordinate values, probability density functions having a distribution within a predetermined range from the calculated coordinate values.

3. The code reading device according to claim 1, wherein the direction detecting unit is configured to search for a plurality of maximal points with a large accumulation value from the accumulation results and determine an alignment direction of at least two points out of the maximal points that have been searched for and the reference point, thereby determining the first direction and the second direction.

4. The code reading device according to claim 3, wherein the direction detecting unit is configured to extract four points closest to the reference point from the maximal points that have been searched for, identify two pairs of two points aligned on both sides of the reference point out of the four points and determine alignment directions of the identified two pairs of the two points to be the first direction and the second direction.

5. The code reading device according to claim 3, wherein the direction detecting unit is configured to search for the maximal points with the large accumulation value by threshold-processing the accumulation results in the two dimensional plane.

6. The code reading device according to claim 3, wherein the direction detecting unit is configured to search for the maximal points with the large accumulation value by filtering the accumulation results in the two dimensional plane.

7. The code reading device according to claim 1, wherein the code detecting unit is configured to:
   calculate ideal lattice points, assuming that the ideal lattice points are associated with the raster order and that the part of the dot marks are arranged with a predetermined fixed value;
   calculate a projective transformation matrix for transforming a coordinate system of the part of the dot marks into a coordinate system of the ideal lattice points, while assuming that the part of the dot marks includes a displacement from the virtual lattice points;
   perform a projective transformation on coordinates of each of the part of the dot marks using the projective transformation matrix so as to obtain post-transformation coordinates; and
   detect a relative position of each of the ideal lattice points to a closest dot mark among dot marks indicated by the obtained post-transformation coordinates according to the raster order, thereby converting the read part of the dot marks to the positional information.

8. The code reading device according to claim 1, wherein the code detecting unit is configured to linearly approximate the part of the dot marks to plural lines of dot marks that are arranged along the first direction and the second direction, according to the raster order of the dot marks determined by the order determining unit, determine points of intersection of straight lines obtained by the linear approximation in the first direction and the second direction to be the lattice points, and detect the relative position of each of the determined lattice points to the closest dot mark according to the raster order, thereby converting the read part of the dot marks to the positional information.

9. A code reading method of reading a part of a plurality of dot marks that are located in a predetermined matrix arrangement displaced in a first direction or a second direction crossing the first direction from virtual lattice points specified by the first direction and the second direction and converting the read part of the dot marks to positional information indicating a position of the part of the dot marks, the method comprising:
   for each of the part of the dot marks, (i) searching for at least four neighboring dot marks, (ii) calculating coordinate values of the at least four neighboring dot marks that have been searched for, using each of the part of the dot marks as a reference point, and (iii) accumulating the calculated coordinate values of the at least four neighboring dot marks in a two dimensional plane;
   determining the first direction and the second direction from voting accumulation results obtained by the accumulating;
   determining a raster order for the part of the dot marks based on the first direction and the second direction determined by the determining of the first direction and the second direction; and
   (i) obtaining coordinate values of the part of the dot marks, (ii) determining lattice points based on the obtained coordinate values of the part of the dot marks and the raster order, and (iii) detecting a relative position of each of the lattice points to a closest dot mark among the part of the dot marks according to the raster order, thereby converting the read part of the dot marks to the positional information.

10. A non-transitory computer-readable recording medium storing a program causing a computer to execute the code reading method according to claim 9.

* * * * *